US008775049B2

(12) United States Patent
Winklhofer et al.

(10) Patent No.: US 8,775,049 B2
(45) Date of Patent: Jul. 8, 2014

(54) METHOD FOR EVALUATING THE STATE OF A FUEL-AIR MIXTURE

(75) Inventors: Ernst Winklhofer, St. Johann Ob (AT); Heribert Fuchs, Stattegg (AT); Alois Hirsch, Graz (AT); Harald Philipp, Hausmannstaetten (AT)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 13/306,241

(22) Filed: Nov. 29, 2011

(65) Prior Publication Data

US 2012/0143458 A1 Jun. 7, 2012

(30) Foreign Application Priority Data

Dec. 1, 2010 (AT) .................................... 1999/2010

(51) Int. Cl.

| | |
|---|---|
| ***G06F 19/00*** | (2011.01) |
| ***F02D 35/02*** | (2006.01) |
| *F02P 13/00* | (2006.01) |
| *F02D 41/14* | (2006.01) |

(52) U.S. Cl.

CPC ............... *F02D 35/022* (2013.01); *F02P 13/00* (2013.01); *F02D 41/1466* (2013.01); *F02D 35/023* (2013.01)

USPC ............. 701/99; 701/100; 701/101; 701/103; 701/123; 431/79; 431/115; 431/126; 431/14; 431/183; 123/526; 123/436; 123/429; 123/295

(58) Field of Classification Search

USPC .............. 701/99, 100, 101, 103, 123; 431/79, 431/115, 126, 14, 183, 354, 76; 123/525, 123/526, 575, 436, 429, 295

See application file for complete search history.

(56) References Cited

U.S. PATENT DOCUMENTS

| | | | | |
|---|---|---|---|---|
| 5,453,838 | A * | 9/1995 | Danielian et al. | 356/600 |
| 6,670,613 | B2 * | 12/2003 | Prozzo et al. | 250/345 |
| 2003/0188967 | A1 * | 10/2003 | Isitani et al. | 204/406 |
| 2008/0228378 | A1 * | 9/2008 | Kohler et al. | 701/103 |
| 2008/0299505 | A1 * | 12/2008 | Winklhofer | 431/79 |
| 2009/0017406 | A1 * | 1/2009 | Fuentes et al. | 431/76 |
| 2010/0292906 | A1 * | 11/2010 | Girouard et al. | 701/100 |
| 2012/0143458 | A1 * | 6/2012 | Winklhofer et al. | 701/99 |

FOREIGN PATENT DOCUMENTS

| | | |
|---|---|---|
| AT | 503276 | 9/2007 |
| FR | 2816056 | 5/2002 |
| JP | 2005226893 | 8/2005 |

OTHER PUBLICATIONS

English Abstract of FR2816056.
English Abstract of JP2005226893.

* cited by examiner

*Primary Examiner* — Redhwan k Mawari
(74) *Attorney, Agent, or Firm* — Dykema Gossett PLLC

(57) ABSTRACT

A method for evaluating the state of a fuel-air mixture and/or the combustion in a combustion chamber of an internal combustion engine, with sample signals of flame light signals being stored in a database, and with flame light signals of the combustion in the combustion chamber being detected and compared with the stored sample signals, and with an evaluation of the state being output in the case of coincidence between the measured and stored signal patterns. In order to enable the monitoring of the combustion in the simplest possible way the sample signals in the database are stored with the assigned emission values and an evaluation of the state of the combustion is performed with respect to the obtained emissions in the case of coincidence between the measured and stored signal patterns for the combustion chamber of the respective cylinder.

25 Claims, 3 Drawing Sheets

METHOD FOR EVALUATING THE STATE OF A FUEL-AIR MIXTURE

BACKGROUND OF THE INVENTION

1. Field of the Invention

The invention relates to a method for evaluating the state of a fuel-air mixture and/or the combustion in a combustion chamber of an internal combustion engine, with sample signals of flame light signals, especially the flame intensity, being stored in a database, and with flame light signals, especially the flame intensity, of the combustion in the combustion chamber being detected and compared with the stored sample signals, and with an evaluation of the state being output in the case of coincidence between the measured and stored signal patterns.

2. The Prior Art

Increasingly stricter limit values for particle emissions require measures for providing the highest possible mixture quality, especially in internal combustion engines with direct injection.

The formation of particles in the combustion of hydrocarbon fuels occurs by sooting.

The reduction in the formation of particles is achieved by precise fuel metering, complete fuel evaporation and by mixing with the combustion air, so that in the end a homogeneous stoichiometric mixture is combusted. These goals place high demands on the injection system and the air-mass control, on processes which have an influence on the mixture formation, and on the charge turbulence.

In the NEDC test (New European Driving Cycle), the particle emissions are evaluated by the measured particle mass and the particle count. The predominant contribution to the emissions is made by starting the engine, the first load peaks of the still operationally cold engine and the high-load operation in the final phase of the test sequence. Strict limit values in the NEDC test can be fulfilled by internal combustion engines only if the initial contributions during the start run and the warm-up run are subjected to precise checks by injection and charge movement. Similarly, the contributions in high-load operation require precise transient tuning and cylinder balancing.

Development measures which have an influence on the mixture formation are aimed at producing finely misted fuel sprays which distribute in the combustion chamber and evaporate by the compression heat. Contact with the cold combustion chamber walls should be prevented because a once formed film on the wall cannot evaporate sufficiently, especially in the cold engine.

Examinations have shown that especially in the cold operating state in a multi-cylinder internal combustion engine, the individual cylinders are involved differently in the particle emissions, so that cylinder-selective measures need to be taken. The analyses of the causes of particle origination are gaining increasing importance in the engine development sequence.

A method for evaluating the state of a fuel-air mixture and/or the combustion in a combustion chamber of an internal combustion engine is known from AT 503 276 A2. Sample signals of flame light signals which are stored in a database and which are assigned to defined mixture states are compared with the patterns of measured flame light signals. In the case of coincidence between the measured and the stored signal patterns, conclusions are drawn on the state of the mixture in the combustion chamber. A precise and simple monitoring of the mixture state and the combustion can be achieved thereby.

A measuring device for evaluating the state of a combustible mixture is further known from FR 2 816 056 A1, with the measuring device comprising a spectrometer, fiber optics and an evaluation device which compares the determined measurement results of the detected spectrum with data stored in a database. The fiber optics connected to the spectrometer is in optical connection with a combustion chamber. The state of the combustible mixture can be determined by comparing the measured data with the signals stored in the database.

JP 2005-226 893 A shows a similar method for combustion diagnostics, with the light emission intensity of a combustion being detected and compared with signals stored in a database. A statement can be made on the state of the air-fuel mixture on the basis of the comparison.

It is the object of the invention to enable a monitoring of the particle emissions with the lowest possible effort.

SUMMARY OF THE INVENTION

This is achieved in accordance with the invention such a way that the sample signals in the database are stored with the assigned emission values, preferably the particle emissions, and an evaluation of the state of the combustion is performed with respect to the obtained emissions, preferably the particle emissions, in the case of coincidence between the measured and stored signal patterns for the combustion chamber of the respective cylinder, with the evaluation of the state of the combustion being performed preferably for each individual cylinder.

In order to enable making sufficiently precise statements on the origination of particles with the lowest possible effort, it is especially advantageous when at least two areas are detected in the combustion chamber via different channels of an optical multichannel sensor, with the combustion being detected preferably via six to twelve, more preferably eight or nine, optical channels of the multichannel sensor, with preferably each channel of the multichannel sensor being assigned to at least one and preferably precisely one area of the combustion chamber, with preferably at least two areas being formed by conical or cylindrical angular segment areas.

An especially good optical monitoring of the combustion can be achieved by a multichannel sensor arranged centrally in the combustion chamber, wherein it is especially advantageous if the multichannel sensor is integrated in a spark plug which preferably also measures the pressure.

It can further be provided within the scope of the invention that a limit value for the flame light intensity is defined and that upon exceeding the limit value in at least one cylinder a measure is performed for reducing the particle emissions in the respective cylinder, with preferably the flame light signals being detected by way of a plurality of successively following combustion cycles.

A simple and rapid evaluation of the combustion can be achieved when the detected flame light signals are numerically evaluated by means of at least one mathematic algorithm over the entire examined measuring duration. A correlation analysis can be performed between the sample signals stored in the database and the measured sample signals.

In order to find "freak values" in the results of the measurement and to determine their meaning for the particle emissions, it can further be provided that a stability examination is performed for at least one stationary point of the operating range of the internal combustion engine, in that individual, singularly occurring flame light signals are evaluated according to defined criteria.

The sample signals can be recorded from measurements under known operating and emission conditions or be derived from theoretical considerations on mixture formation and on combustion. It is also possible that sample signals are produced from computational linkage of flame light signal and cylinder pressure signals or signals derived therefrom, such as the progression of heat release.

If a time signal such as a crank angle signal is detected and the flame light signals are assigned to the time signal, the cause of the increased particle emissions can be derived from the position and the progression of the flame light signal. A direct statement can be made on the quality and quantity of the particle emissions by comparing the detected flame light signals with the sample signals stored in a database. It can further be provided that a pressure measurement in the cylinder and/or a particle measurement at the end of the exhaust train is performed at least temporarily simultaneously with the detection of the flame light signals. The simultaneous and cycle-true pressure measurement and/or particle measurement increases the precision and reliability of the statement quality and is therefore a refinement of the measuring process. A higher precision and accuracy in statements on particle emissions is possible by the combined evaluation of the cylinder pressure and/or the particle measurement and flame light.

It is an important advantage of the method in accordance with the invention that the information is available for each cylinder in a cycle-true manner. This allows an especially precise control of the combustion in real time, by means of which particle emissions can substantially be improved.

In order to make statements across engines it is further advantageous if dimensionless characteristics are formed on the basis of the flame light signals, the particle measurements and/or the pressure measuring signals, and the characteristics form the basis for the evaluation of the particle emissions and/or the mixture state and/or the combustion.

It is provided for performing the method that at least one optical multichannel sensor opens into each cylinder, with the optical multichannel sensor being connected with at least one multichannel signal evaluation device, with preferably the signal evaluation device being connected with a database in which sample signals of flame light signals with assigned particle emissions are stored.

BRIEF DESCRIPTION OF THE DRAWINGS

The invention will now be explained in greater detail by reference to the drawings, wherein.

DETAILED DESCRIPTION OF THE DRAWINGS

Figure 1:
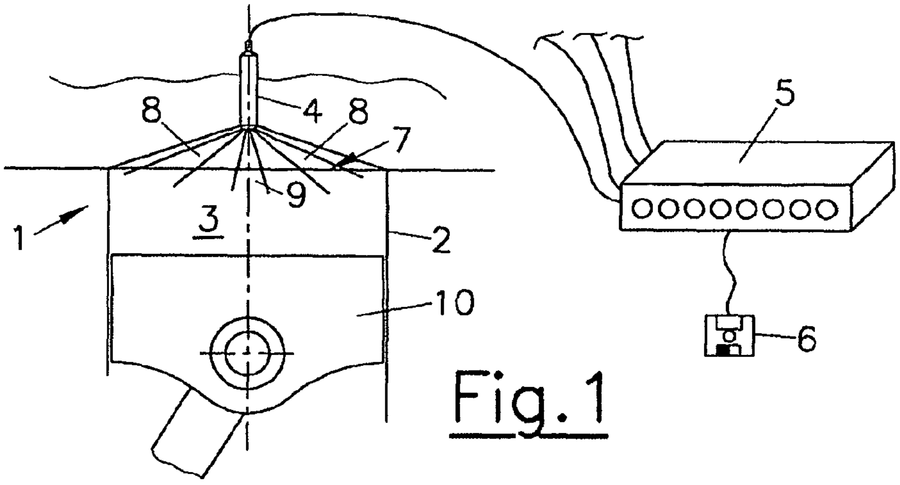
FIG. 1 shows an apparatus for performing the method in accordance with the invention.

FIG. 1 schematically shows an internal combustion engine 1 with the several cylinders 2, with a flame light measurement being performed in each cylinder 2. For this purpose, an optical multichannel sensor opens into the combustion chamber 3 of each cylinder 2, which sensor can be integrated in a spark plug for example. Each sensor 4 is in connection with a multichannel signal evaluation device 5 which has access to a database 6 in which sample signals of flame light signals with assigned particle emissions are stored. The multichannel sensor 4 comprises a substantially fanlike detection region with measuring segments 8, 9 shaped in the manner of a cylinder segment or conical segment, with preferably eight measuring segments 8 being arranged in a fanlike manner in the circumferential direction around the sensor 4 and a measuring segment 9 in the axial direction, i.e. in the direction of piston 10. Each measuring segment 8, 9 is assigned to a measuring channel. This allows obtaining and evaluating information on the light intensity from different regions of the combustion chamber 3.

The formation of particles in the combustion of CH fuels occurs by sooting, especially by combustion as a wall film or as fuel present in floating droplets. If fluid fuel is present as a wall film or in floating droplets, it is ignited by a premix flame and is combusted in a sooting diffusion flame. The quantity and quality of the particle emissions therefore correlates with the flame intensity or the flame pattern signal observed in the combustion chamber.

Figures 2A, 2B, 2C, 2D:
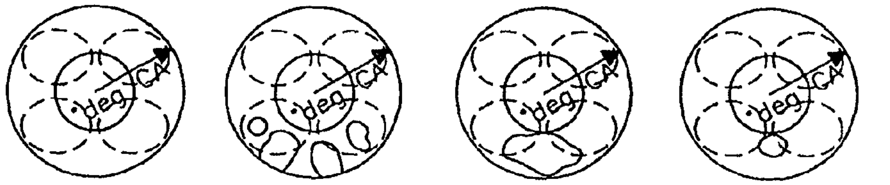
FIG. 2*a* to FIG. 2*d* show various flame light patterns.
Figures 3A, 3B, 3C:
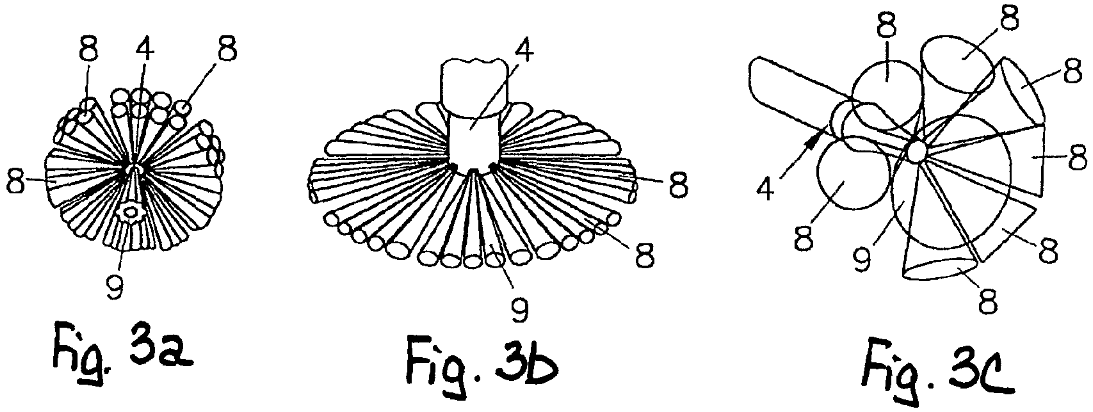
FIG. 3*a* to FIG. 3*c* show an optical multichannel sensor in various oblique views.

FIG. 2 shows a partial stratification of the fuel in the combustion chamber 3 under different operating conditions of the injector. FIG. 2*a* shows the distribution of the flames in ideal mixture formation and subsequent premix combustion. FIG. 2*b* shows the wetting of the wall with diffusion combustion, which is recognizable from the locally more intensive flame signals. FIG. 2*c* and FIG. 2*d* show diffusion flames as the result of deficient injector tightness.

Sooting diffusion flames stand out in the light signals very easily by high intensity peaks. The same pattern signal of a soot-free premix flame is characterized by a typical isotropic signal ring (FIG. 2*a*).

Figure 4A:
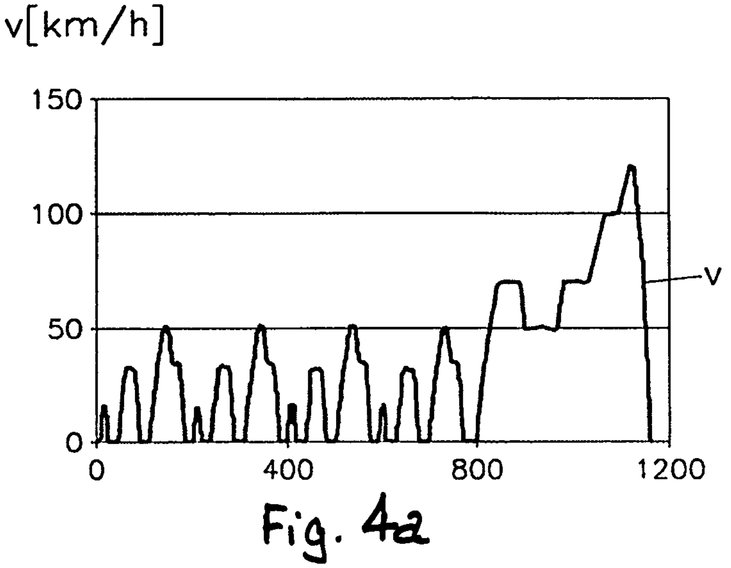
FIG. 4*a* shows the driving speed over time for a driving cycle.
Figure 4B:
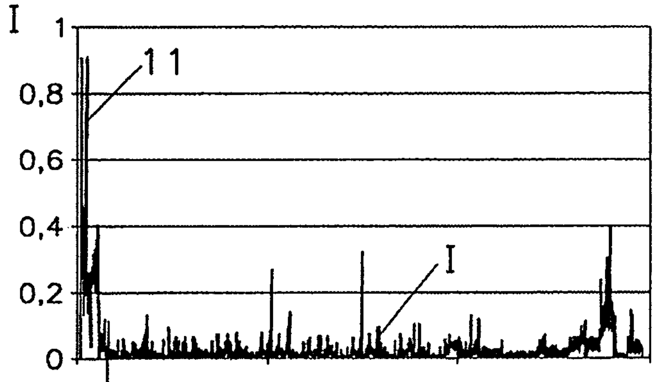
FIG. 4*b* and FIG. 4*c* show a diffusion light signal diagram for this driving cycle.
Figure 4C:
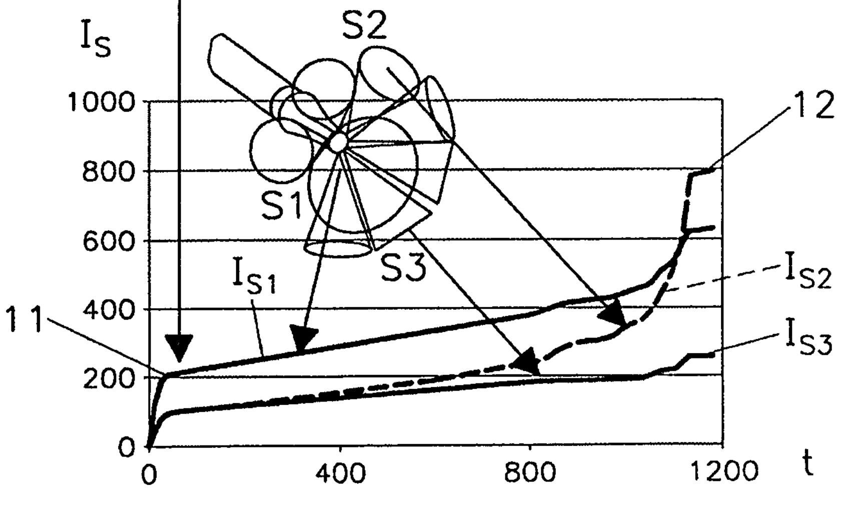

FIG. 4*a* shows the speed v and FIG. 4*b* the light intensity I for the measurement region S1 facing the piston 10. FIG. 4*c* shows the light intensity $I_s$ which is integrated up and which is entered over the test cycle duration t for the measuring areas S2, S3 directed towards the piston 10, the inlet valves and the outlet valves. The various lines for the light intensity $I_s$ show different regions S1, S2, S3 in the combustion chamber, with each region being assigned to a channel of the multichannel sensor 4. As a result, the sections 11 and 12 of the intensities I, $I_s$ can be assigned to the piston 10 or a right inlet valve.

Figure 5:
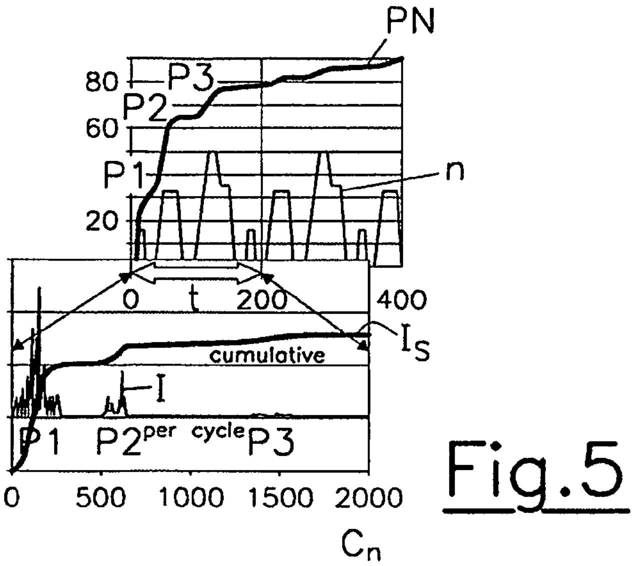
FIG. 5 shows a comparison between particle measurement and flame light measurement.

The evaluation of the combustion of the light intensity measurement in the combustion chamber 3 with measuring spark plugs allows a cylinder-true and cycle-true evaluation, and a targeted evaluation and optimization of individual amounts, especially in the relevant load-change intervals. It is further possible by means of the method to assume calibration tasks for evaluating the combustion on the basis of the light intensity measurements. For the purpose of signal detection, spark plugs with pressure and flame light sensors can be used or combustion pressure sensors derived therefrom. Signals are available as information from which a simple evaluation of premix and diffusion fractions in a combustion cycle will occur. A flame light integral is used in addition to the pressure evaluation for a cycle summary. FIG. 5 shows such a flame light integral $I_s$ from the initial phase of an NEDC test in the cycle sequence for a selected cylinder. In the cumulative signal representation, this flame light measurement corresponds to the measurement curves of the exhaust gas measurement, but shows the contribution of an individual cylinder with cycle-true assignment. Characteristic points in the light intensity progression are designated with P1, P2, P3. The cumulative light intensity $I_s$ corresponds to the particle count PN measured at the end of the exhaust train.

Figure 6:
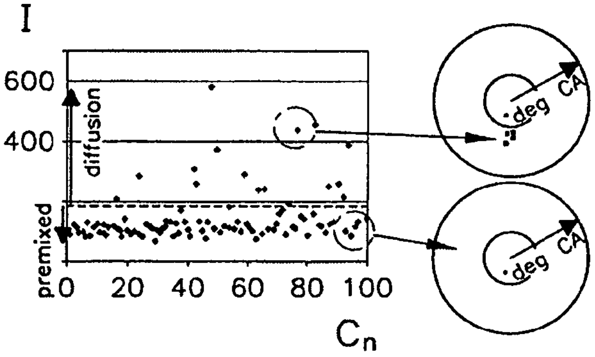
FIG. 6 shows a diffusion light signal diagram with typical freak values of the measurement.

A large number of cycles is required for a systematic engine analysis. For this purpose, the signal evaluation occurs with algorithms which numerically evaluate the entire cycle sequences and represent the same in statistical results. The finding of anomalies will be supported by correlation analyses. Cycles identified as conspicuous can be evaluated visually. FIG. 6 shows the example of a stability examination in a stationary point, with the light intensity peaks I being entered over the number of cycles $C_n$. The mixing combustion occurs beneath the line 23 and diffusion combustion occurs above the line 11. Exceptionally high intensity peaks in individual cycles indicate insufficient injector stability. The finding of these "freak values" can occur in an automated manner.

Figure 7A:
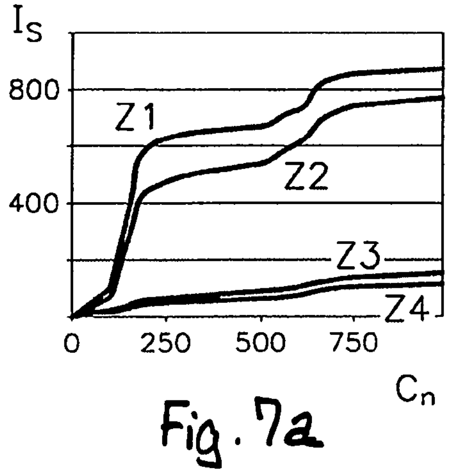
FIG. 7 shows a flame light measurement in an internal combustion engine with and without particle-preventing measures.
Figure 7B:
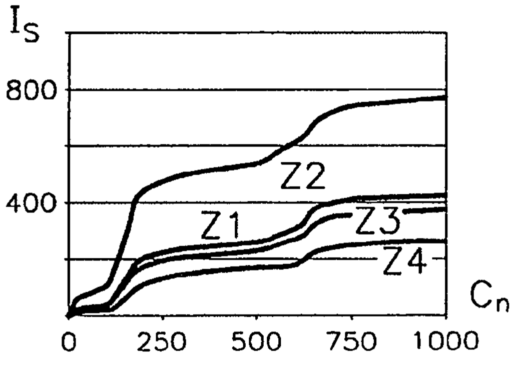

The possibility to evaluate individual cylinders in their contribution to the overall result of the exhaust gas testis used in the variant test as shown in FIG. 7 to compare individual injectors in the driving test. The signal progressions in image FIG. 7A show an unexpectedly high discrepancy of the individual cylinder contributions of the cylinders Z1, Z2, Z3 and Z4. After an alternating exchange of the injectors, there is a considerable improvement in cylinder Z1 for example; cylinder Z2 remains unchanged, and the diffusion fractions in the flame light signal $I_s$ increase in the two cylinders Z3 and Z4. The use of this cylinder-selective flame measuring technology therefore provides the possibility to evaluate variant tests for particle emissions within a normal driving cycle in their specific effects on the exhaust gas test.

The invention claimed is:

1. A method for evaluating a state of at least one of a fuel-air mixture and combustion in a combustion chamber of an internal combustion engine, said method comprising the steps of:

(a) positioning a component which includes an optical multichannel sensor in an opening of a combustion chamber such that the optical multichannel sensor is positioned centrally in the middle of the combustion chamber, with each channel of the optical multichannel sensor being directed to at least one area within the combustion chamber, (b) providing a database containing sample values of flame light signals and associated emission values, (c) detecting flame light signals of combustion from at least two areas within the combustion chamber using the optical multichannel sensor, (d) comparing values of the detected flame light signals from step (c) with sample values of flame light signals in the database, (e) evaluating said state with coincidence of patterns of values of detected and sample flame light signals, and (f) evaluating said state of combustion with coincidence of patterns of detected and sample emission values.

2. The method according to claim 1, wherein the combustion is detected via six to twelve optical channels of the multichannel sensor.

3. The method according to claim 1, wherein a limit value for flame light intensity is defined and upon exceeding the limit value in at least one cylinder, a measure is performed for reducing particle emissions in the respective cylinder.

4. The method according to claim 1, wherein the detected flame light signals are detected over several successive combustion cycles.

5. The method according to claim 1, wherein the detected flame light signals are numerically evaluated over the entire inspected measuring duration by means of at least one mathematical algorithm.

6. The method according to claim 1, wherein correlation analyses are performed between the detected flame light signals and the stored sample signals.

7. The method according to claim 1, wherein a stability examination is performed for at least one stationary point of the operating range of the internal combustion engine, in that individual, singularly occurring flame light signals are evaluated according to defined criteria.

8. The method according to claim 1, wherein sample signals from measurements under known operating and emission conditions are recorded.

9. The method according to claim 1, wherein sample signals are derived from theoretical considerations on mixture formation and combustion.

10. The method according to claim 1, wherein sample signals are produced from a computational linkage of flame light signals and cylinder pressure signals or signals derived therefrom.

11. The method according to claim 1, wherein a time signal is detected and the flame light signals are assigned to the time signal.

12. The method according to claim 1, wherein conclusions are drawn on the emissions from the position and the progression of the flame light signal.

13. The method according to claim 1, wherein a pressure measurement is also performed in the respective cylinder simultaneously with the measurement of the flame light signals.

14. The method according to claim 13, wherein the cylinder pressure peaks are compared with the flame light signal peaks within at least one cycle.

15. The method according to claim 14, wherein conclusions are drawn on irregular combustion from at least one deviation between the cylinder pressure peaks and the light signal peaks.

16. The method according to claim 14, wherein an optimization procedure is performed for the parameterization of the injection and/or the air throttling depending on the mixture state and/or the deviation of the cylinder pressure peaks from the light signal peaks.

17. The method according to claim 1, wherein a measurement of the emissions is performed simultaneously with the detection of the flame light signals.

18. The method according to claim 17, wherein the cumulatively detected emissions are compared with flame light signals peaks detected in a cylinder-selective manner and are assigned to the respective cylinder.

19. The method according to claim 1, wherein dimensionless characteristics are formed on the basis of the flame light signals and/or the pressure measuring signals and/or the emission measuring signals and the characteristics form the basis for the evaluation of the mixture state and/or the combustion.

20. An apparatus for performing the method for evaluating the state of a fuel-air mixture and/or the combustion in at least one combustion chamber of an internal combustion engine according to claim 1, wherein at least one multichannel sensor opens into each cylinder of the internal combustion engine, with each optical multichannel sensor being connected with at least one multichannel signal evaluation device.

21. The apparatus according to claim 20, wherein each multichannel signal evaluation device is connected with a database in which sample signals of flame light signals with assigned particle emissions are stored.

22. The apparatus according to claim 20, wherein at least one optical multichannel sensor is integrated in a component opening into the combustion chamber of at least one cylinder.

23. The method according to claim 1, wherein the associated emission values and the obtained emissions are particle emissions.

24. The method according to claim 1, wherein at least two areas are formed by conical or cylindrical measuring segment areas.

25. The method according to claim 1, wherein the evaluation of the state of the combustion is performed for each individual cylinder of the internal combustion engine.

* * * * *